United States Patent
Mori et al.

(10) Patent No.: US 10,619,614 B2
(45) Date of Patent: Apr. 14, 2020

(54) VEHICLE ENGINE AUTOMATIC CONTROL DEVICE AND VEHICLE ENGINE AUTOMATIC CONTROL METHOD

(71) Applicant: Nissan Motor Co., Ltd., Kanagawa (JP)

(72) Inventors: Kouichi Mori, Kanagawa (JP); Motoyuki Hattori, Kanagawa (JP)

(73) Assignee: Nissan Motor Co., Ltd., Kanagawa (JP)

( * ) Notice: Subject to any disclaimer, the term of this patent is extended or adjusted under 35 U.S.C. 154(b) by 0 days.

(21) Appl. No.: 14/362,700

(22) PCT Filed: Nov. 16, 2012

(86) PCT No.: PCT/JP2012/079811
§ 371 (c)(1),
(2) Date: Jun. 4, 2014

(87) PCT Pub. No.: WO2013/084697
PCT Pub. Date: Jun. 13, 2013

(65) Prior Publication Data
US 2014/0336907 A1    Nov. 13, 2014

(30) Foreign Application Priority Data

Dec. 6, 2011    (JP) .................... 2011-266602

(51) Int. Cl.
*F02N 11/08* (2006.01)
*B60W 30/18* (2012.01)
(Continued)

(52) U.S. Cl.
CPC .......... *F02N 11/084* (2013.01); *B60T 7/042* (2013.01); *B60T 17/00* (2013.01);
(Continued)

(58) Field of Classification Search
CPC ....... F02N 2200/0807; F02N 2200/102; F02N 11/084; F02D 2250/41; F02D 29/00; F02D 41/042; F02D 41/06
(Continued)

(56) References Cited

U.S. PATENT DOCUMENTS 6,347,608 B1 * 2/2002 Hara ................. F02N 11/084
123/179.4
6,624,527 B1 * 9/2003 Crombez ................ B60K 6/48
290/40 C (Continued)

FOREIGN PATENT DOCUMENTS

EP    0 990 793 A2    4/2000
JP    2000-310133 A    11/2000
(Continued)

OTHER PUBLICATIONS

International Search Report issued in PCT/JP2012/079811 dated Dec. 11, 2012 (4 pages).
(Continued)

*Primary Examiner* — Erick R Solis
*Assistant Examiner* — Robert A Werner
(74) *Attorney, Agent, or Firm* — Osha Liang LLP (57) ABSTRACT

A vehicle engine automatic control device has a brake pedal operation amount detecting unit that detects an amount of brake pedal operation by a driver, a negative pressure-based force multiplying unit that multiplies a force, with which a brake is operated, using an intake negative pressure of an engine, a negative pressure detecting unit that detects a negative pressure of the negative pressure-based force multiplying unit, and a coast stop control unit that stops the engine when the amount of brake pedal operation that is detected is equal to or greater than a first operation amount threshold during coast drive, and re-starts the engine when the negative pressure that is detected falls below a first negative pressure threshold after the engine stops.

4 Claims, 3 Drawing Sheets

(51) Int. Cl.
  *B60T 17/00* (2006.01)
  *B60T 7/04* (2006.01)
  *F02D 29/00* (2006.01)

(52) U.S. Cl.
  CPC ............ *B60W 30/18018* (2013.01); *B60W 30/18063* (2013.01); *B60W 30/18072* (2013.01); *F02D 29/00* (2013.01); *B60W 2030/1809* (2013.01); *B60W 2030/18081* (2013.01); *B60W 2520/10* (2013.01); *B60W 2540/12* (2013.01); *F02N 2200/0801* (2013.01); *F02N 2200/0807* (2013.01); *F02N 2200/101* (2013.01); *F02N 2200/102* (2013.01); *Y02T 10/48* (2013.01)

(58) Field of Classification Search
  USPC ............... 701/112, 113; 123/179.3, 179.4
  See application file for complete search history.

(56) References Cited

U.S. PATENT DOCUMENTS

| | | | | |
|---|---|---|---|---|
| 6,664,651 | B1 * | 12/2003 | Kotre | B60K 6/365 180/65.245 |
| 6,702,718 | B2 * | 3/2004 | Tani | F02D 41/042 477/203 |
| 6,754,579 | B2 * | 6/2004 | Kamiya | B60K 41/202 477/203 |
| 2002/0103055 | A1 | 8/2002 | Tani et al. | |
| 2011/0270501 | A1 | 11/2011 | Ito et al. | |

FOREIGN PATENT DOCUMENTS

| | | |
|---|---|---|
| JP | 2002-195068 A | 7/2002 |
| JP | 2002-221059 A | 8/2002 |
| JP | 2004-084593 A | 3/2004 |
| JP | 4374805 B2 | 12/2009 |
| JP | 2010-163898 A | 7/2010 |
| JP | 2011127439 A | 6/2011 |
| JP | 2012-077647 A | 4/2012 |
| WO | 2011/135725 A1 | 11/2011 |
| WO | 2012/042341 A1 | 4/2012 |

OTHER PUBLICATIONS

Written Opinion of the International Searching Authority issued in PCT/JP2012/079811 dated Dec. 11, 2012 (5 pages).

* cited by examiner

VEHICLE ENGINE AUTOMATIC CONTROL DEVICE AND VEHICLE ENGINE AUTOMATIC CONTROL METHOD

BACKGROUND

Technical Field

The present invention relates to an engine automatic control device that automatically stops and re-starts the engine while driving.

Related Art

As a vehicle engine automatic control device, the technology described in JP4374805B has been disclosed. According to this device, even while the vehicle is driving, the engine is stopped when the amount of brake operation becomes equal to or greater than an engine stop determination threshold, to improve mileage, and the engine is re-started when the amount of brake pedal operation becomes equal to or lower than an engine start determination threshold.

SUMMARY OF INVENTION

With a system having a negative pressure-based force multiplying means that multiplies the force with which the brake is operated by using negative pressure like a masterback, it is necessary to start the engine and secure negative pressure when the negative pressure from the negative pressure-based force multiplying means ceases after the engine stops.

However, if the engine is re-started after the negative pressure from the negative pressure-based force multiplying means ceases while the vehicle is driving, negative pressure is suddenly produced and the force with which the brake is operated is multiplied, and therefore there is a possibility that the braking force becomes stronger and a sudden increase of deceleration occurs.

One or more embodiments of the present invention provides a vehicle engine automatic control device that can prevent causing sudden deceleration.

The vehicle automatic control device according to one embodiment stops the engine when the amount of brake pedal operation that is detected is equal to or greater than a first operation amount threshold during coast drive, and re-starts the engine when the negative pressure that is detected falls below a first negative pressure threshold after the engine stops.

Embodiments of the present invention and advantages of the present invention will be described in detail below with reference to the accompanying drawings.

DETAILED DESCRIPTION

Embodiments of the present invention will be described below with reference to the drawings. In embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid obscuring the invention.

Embodiment 1

[System Configuration]

Figure 1:
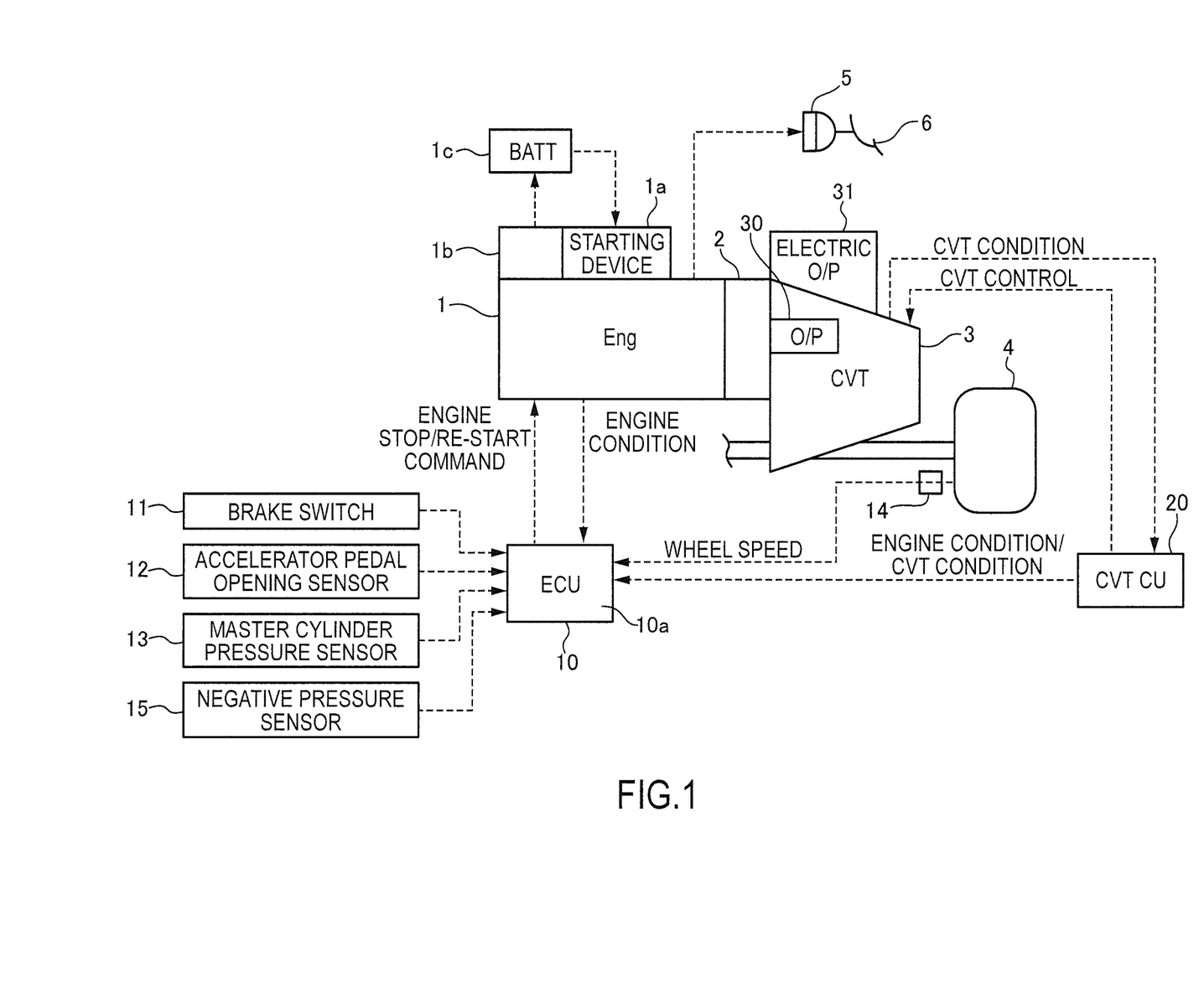
FIG. 1 is a system diagram showing a configuration of a vehicle engine automatic control device according to embodiment 1.

FIG. 1 is a system diagram showing a configuration of a vehicle engine automatic control device according to embodiment 1. On the output side of an engine 1, which is an internal combustion engine, a torque converter 2 is provided. To the output side of the torque converter 2, a belt-type continuously-variable transmission 3 is connected. Rotational driving force that is output from the engine 1 is input in the belt-type continuously-variable transmission 3 via the torque converter 2, and, after a gear change by a desired transmission ratio, transmitted to drive wheels 4.

The engine 1 has a starting device 1a that starts the engine, and an alternator 1b that generates power. In the starting device 1a, a starter motor is provided. Based on an engine start command, the starting device 1a drives the starter motor using power that is supplied from an in-vehicle battery 1c, and cranks the engine. Also, the starting device 1a injects fuel, and, after that, when the engine 1 becomes capable of self-sustaining rotation, stops the starter motor. The alternator 1b generates power by being allowed to rotate and drive by the engine 1, and supplies the generated power to the in-vehicle battery 1c and so on.

The torque converter 2 amplifies torque when the vehicle speed is low. The torque converter 2 also has a lockup clutch, and engages the lockup clutch and regulates the relative rotation between the output shaft of the engine 1 and the input shaft of the belt-type continuously-variable transmission 3 at and above a predetermined vehicle speed CSVSP1 (for example, approximately 14 km/h).

The belt-type continuously-variable transmission 3 is formed with a starter clutch, a primary pulley, a secondary pulley, and a belt that is provided to bridge over these pulleys, and achieves a desired transmission ratio by changing the pulley groove width with hydraulic pressure control. Also, in the belt-type continuously-variable transmission 3, an oil pump 30 to be driven by the engine 1 is provided. While the engine is working, this oil pump 30 serves as a hydraulic pressure source, supplies the converter pressure and the lockup clutch pressure of the torque converter 2, and also supplies the pulley pressure and the clutch engagement pressure of the belt-type continuously-variable transmission 3.

Furthermore, apart from the oil pump 30, an electric oil pump 31 is provided in the belt-type continuously-variable transmission (CVT) 3, and the electric oil pump 31 is configured to be able to activate and supply the required hydraulic pressure to each actuator when the engine automatically stops and the supply of hydraulic pressures by the oil pump 30 is not possible. Consequently, even when the engine is stopped, it is possible to compensate for leakage of the working oil, and also maintain the clutch engagement pressure.

Ahead of the brake pedal 6, a masterback 5 is provided. This masterback 5 multiplies the force with which the brake is operated by using the intake negative pressure of the engine 1.

The working conditions of the engine 1 are controlled by an engine control unit 10. In the engine control unit 10, a brake signal from a brake switch 11, which outputs ON signals in accordance with brake pedal operations by the driver, an accelerator signal from an accelerator pedal opening sensor 12, which detects the amount of accelerator pedal operation by the driver, a brake pedal operation amount signal (master cylinder pressure) from a master cylinder pressure sensor 13, which detects the master cylinder pressure that is produced based on the amount of brake pedal operation, the wheel speed from wheel speed sensors 14, which are provided in each wheel (the wheel speed is synonymous to a vehicle speed signal when the vehicle speed is detected from the wheel speed), a negative pressure signal from a negative pressure sensor 15, which detects the negative pressure in the masterback 5, a CVT condition signal from a CVT control unit 20, which will be described later, and signals representing the engine water temperature, the crank angle, the engine rotation speed and so on, are input. The engine control unit 10 executes the start or automatic stop of the engine 1, based on the variety of signals given above.

Note that it is equally possible to detect the driver's intention regarding braking operation by detecting the amount of brake pedal operation using a sensor to detect the amount of brake pedal stroke and the force with which the brake pedal is stepped on, a sensor to detect the wheel cylinder pressure, and so on, instead of the master cylinder pressure sensor 13, and the master cylinder pressure sensor 13 is by no means limiting.

The CVT control unit 20 transmits and receives signals of the engine working conditions and the CVT conditions between the CVT control unit 20 and the engine control unit 10, and, based on these signals, controls the transmission ratio of the belt-type continuously-variable transmission 3 and so on. To be more specific, when a driving range is selected, the CVT control unit 20 engages the starter clutch, and, furthermore, determines the transmission ratio from a transmission ratio map based on the accelerator pedal opening and vehicle speed, and controls each pulley pressure. Also, although the CVT control unit 20 disengages the lockup clutch when the vehicle speed is lower than the predetermined vehicle speed CSVSP1, when the vehicle speed is equal to or greater than the predetermined vehicle speed CSVSP1, the CVT control unit 20 engages the lockup clutch to place the engine 1 and the belt-type continuously-variable transmission 3 in a directly coupled state. Furthermore, when the engine stops automatically while a driving range is selected, the CVT control unit 20 activates the electric oil pump 31 and secures the required hydraulic pressure.

[Engine Automatic Stop/Re-Start Control]

Next, the engine automatic stop control process will be described. The vehicle engine automatic control device (engine control unit 10) of present embodiment 1 stops engine idling when predetermined conditions hold (various conditions such as that the brake pedal 6 is stepped on sufficiently) while the vehicle is stopped—that is, the engine automatic control device performs what may be referred to as idling stop control. Note that the idling stop control has only to implement public-domain configurations as appropriate, and therefore detailed descriptions thereof will be omitted. In addition, coast stop control, by which the engine 1 is stopped even while the vehicle is driving if the vehicle is decelerating and is decided to be highly likely to stop and shift to idling stop control via decelerating fuel cut control in the course of time, is executed. That is to say, in what may be referred to as the coast driving state (including the state in which the brake pedal is operated), in which the driver does not operate the accelerator pedal but the vehicle nevertheless keeps driving by inertia, fuel injection is stopped.

Although fuel injection is stopped during the decelerating fuel cut control, the engine rotation speed is maintained by the coast torque that is transmitted from the drive wheels 4, via the lockup clutch. However, since the lockup clutch is disengaged upon deceleration down to the predetermined vehicle speed CSVSP1, the engine 1 stops unless fuel is injected. So, conventionally, at the time the lockup clutch is disengaged, decelerating fuel cut control is suspended, fuel injection is resumed, and the engine's self-sustaining rotation is maintained, and, furthermore, after the vehicle stops completely, engine idling is stopped. However, in the above step of, from the driving state in which fuel injection is stopped, resuming fuel injection once and then stopping the engine again in this way, mileage can be improved if the fuel upon resuming fuel injection can be reduced even more. So, the coast stop control according to present embodiment 1 is configured such that, when predetermined conditions hold, it is possible to keep the engine 1 stopped (without fuel injection and so on), without resuming fuel injection, and, after the vehicle stops, shift to normal idling stop control in the course of time.

One condition for executing coast stop control is that the amount of brake pedal operation by the driver is equal to or greater than a predetermined value. The reason that the amount of brake pedal operation is made one of the conditions is that coast stop control should be started or finished (suspended) based on the driver's intention of braking.

That is, when the amount of brake pedal operation becomes equal to or greater than a predetermined value, it is possible to assume the driver's intention for braking, and, given that the vehicle is highly likely to stop and shift to idling stop control in the course of time, the engine 1 that is working is stopped and the coast stop control is started. After the coast stop control is started, if the amount of brake pedal operation decreases and falls below the predetermined value, it is possible to assume the driver's intention for not braking (intention to continue driving), and therefore the engine 1 that is stopped is re-started, and the coast stop control is finished (suspended).

Furthermore, with embodiment 1, the condition for re-starting the engine (finishing coast stop control) while driving is that the negative pressure in the masterback 5 falls below a predetermined value. That is, even when the vehicle speed is lower than the predetermined vehicle speed CSVSP1 and the amount of brake pedal operation is equal to or greater than a predetermined value, if the negative pressure falls below the predetermined value, the engine 1 that is stopped is re-started and the coast stop control is finished (suspended).

Negative pressure is used as a condition to re-start the engine 1 for the following reasons:

In a vehicle having a brake masterback 5 that multiplies the force with which the brake pedal is operated by utilizing the negative pressure that is produced by the rotation of the engine 1, the force with which the brake is operated lowers when the engine stops and the negative pressure from the masterback 5 ceases, and therefore it becomes necessary to start the engine 1 and secure negative pressure. However, if the engine 1 is re-started in a state where negative pressure has ceased while the vehicle is driving, there is a threat that negative pressure is produced suddenly and multiplies the force with which the brake is operated, and that therefore the braking force becomes stronger and a sudden increase of deceleration occurs. Consequently, an engine re-start determination threshold (a negative pressure threshold THNP to disallow coast stop control) to take into account the above circumstances is set, and the engine 1 is re-started when the negative pressure becomes equal to or lower than the negative pressure threshold THNP.

[Engine Automatic Stop/Re-Start Control Process]

Figure 2:
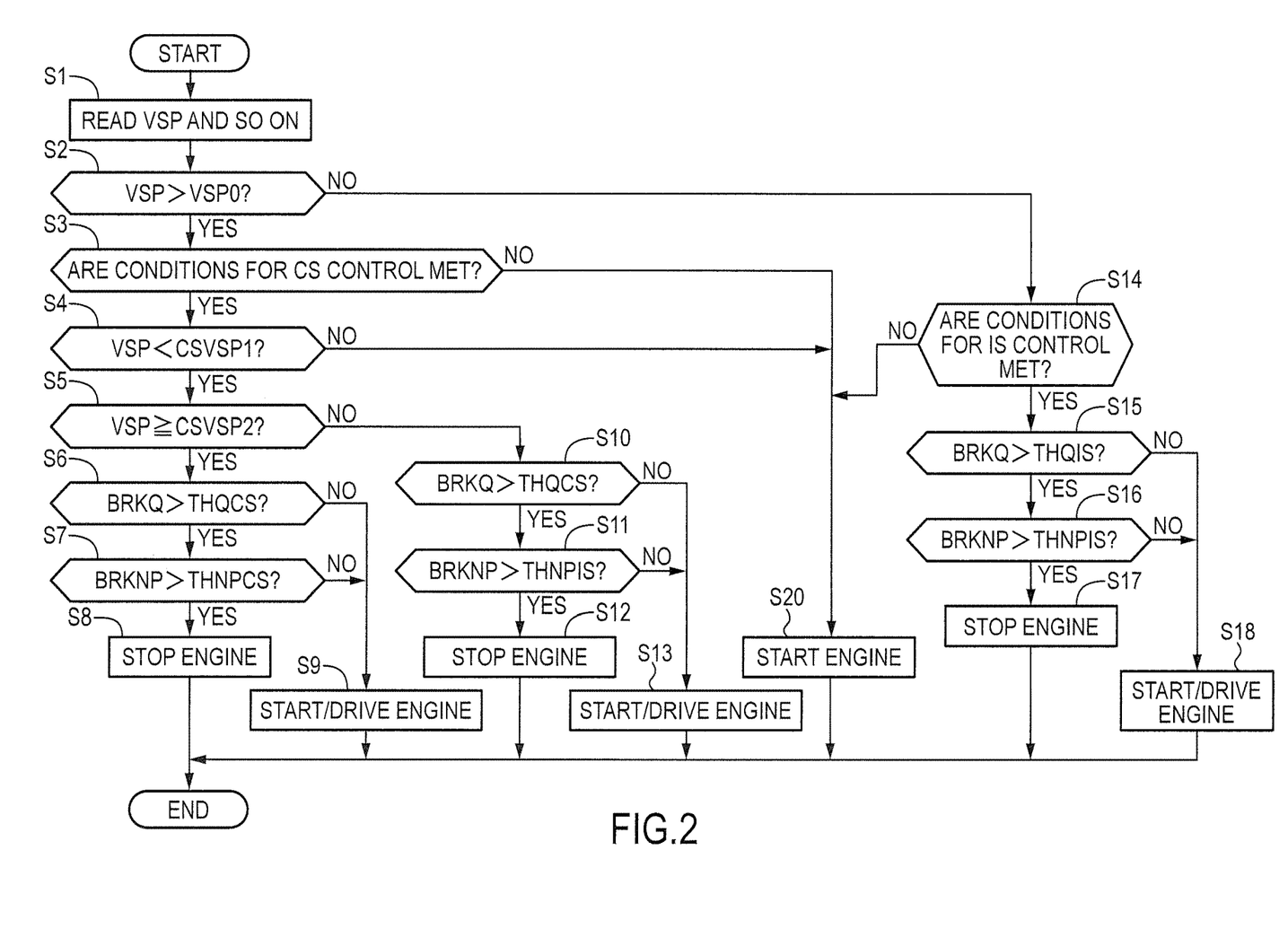
FIG. 2 is a flowchart showing an engine automatic stop/re-start control process according to embodiment 1.

FIG. 2 is a flowchart showing the engine automatic stop/re-start control process that is executed in the engine control unit 10 according to embodiment 1.

In step S1, the vehicle speed VSP, the deceleration DVSP, the amount of brake pedal operation (master cylinder pressure) BRKQ, the threshold (IS operation amount threshold THQIS) for the amount of brake pedal operation BRKQ and the threshold (IS negative pressure threshold THNPIS) for negative pressure BRKNP for allowing idling stop control, and the threshold (CS operation amount threshold THQCS) for the amount of brake pedal operation BRKQ and the threshold (CS negative pressure threshold THNPCS) for negative pressure BRKNP for allowing coast stop control, are read, and the step moves on to step S2.

The vehicle speed VSP may be an average value of each wheel speed detected by the wheel speed sensors 14, or may be an average value of the wheel speed of the driven wheels, and is not particularly limited.

The IS operation amount threshold THQIS for the amount of brake pedal operation BRKQ is set to a greater value than the CS operation amount threshold THQCS. This is because, if the engine is started in a state in which the vehicle is stopped and in which idling stop is executed, although creep torque is output, given that the braking force by the brake is low in this state, there is a possibility that the vehicle might move unexpectedly due to this creep torque. Also, the state in which coast stop is made is one in which the vehicle is decelerating (that is, during drive), and, in this state, improving mileage by stopping the engine as much as possible is intended. Another reason is that, even if the engine 1 is re-started before the vehicle stops, as long as the vehicle is driving, the driver is little likely to feel a jumpy feeling due to creep torque.

Also, the CS negative pressure threshold THNPCS for the negative pressure threshold THNP is set to be in a range (magnitude) where a change in deceleration (the braking force) due to the difference in negative pressure between this CS negative pressure threshold THNPCS and the negative pressure after the engine is re-started does not give the driver a sense of discomfort.

Furthermore, the CS negative pressure threshold THN-PCS is set to a greater value than the IS negative pressure threshold THNPIS. This is because, in the state in which coast stop is made, the vehicle is still driving, and, if the engine 1 is re-started in a state where negative pressure has ceased, negative pressure is produced suddenly and the force with which the brake is operated becomes stronger, and therefore a sudden increase of deceleration occurs. Meanwhile, the state in which the vehicle is stopped is assumed during idling stop control, so that, even if the engine 1 is re-started in a state in which negative pressure has ceased, there is no increase in deceleration. Also, from the perspective of improving mileage, it is preferable to maintain the state in which the engine 1 is stopped as much as possible. By this means, during coast stop control, a sudden increase of deceleration due to negative pressure that is produced suddenly while the vehicle is driving is prevented, and, during idling stop control, mileage is improved by securing the time to stop the engine 1.

In step S2, whether or not the vehicle speed VSP is greater than a predetermined value VSP0, which represents the state in which the vehicle is stopped, is decided. When the vehicle speed VSP is greater than the predetermined value VSP0, the step moves on to step S3, and, otherwise, the step moves on to step S14. The predetermined value VSP0 may be zero or may be in a very low vehicle speed range such as approximately 1 to 2 km/h, as long as the vehicle can be determined to be virtually stopped at that value. Note that other conditions that are not shown in this flowchart may be added and set as appropriate.

In step S3, whether or not the conditions to allow coast stop control—to be more specific, whether or not the coast driving state (in which the amount of accelerator pedal operation is zero) is assumed and also the brake pedal 6 is being operated—are met, is decided. When the conditions to allow coast stop control are met, the step moves on to step S4, and, otherwise, the step moves on to step S20 and the engine working conditions are retained.

In step S4, whether or not the vehicle speed VSP falls below the predetermined vehicle speed CSVSP1 to allow the engine to be stopped, is decided. When the vehicle speed VSP falls below the predetermined vehicle speed CSVSP1, the step moves on to step S5, and, otherwise, the step moves on to step S20 and the engine working conditions are retained.

In step S5, whether or not the vehicle speed VSP is equal to or greater than a predetermined vehicle speed CSVSP2 is decided. If the vehicle speed VSP is equal to or greater than the predetermined vehicle speed CSVSP2, the step moves on to step S6, and, otherwise, the step moves on to step S10.

In step S6, whether or not the amount of brake pedal operation BRKQ exceeds the CS operation amount threshold THQCS is decided. When the amount of brake pedal operation BRKQ exceeds the CS operation amount threshold THQCS, the step moves on to step S7, and, otherwise, the step moves on to step S9, and the engine is started or the engine working conditions are retained.

In step S7, whether or not the negative pressure BRKNP exceeds the CS negative pressure threshold THNPCS is decided. When the negative pressure BRKNP exceeds the CS negative pressure threshold THNPCS, the step moves on to step S8 and the engine 1 is stopped, and, otherwise, the step moves on to step S9, and the engine is started or the engine working conditions are retained.

In step S10, whether or not the amount of brake pedal operation BRKQ exceeds the IS operation amount threshold THQCS is decided. When the amount of brake pedal operation BRKQ exceeds the CS operation amount threshold THQCS, the step moves on to step S11, and, otherwise, the step moves on to step S13, and the engine is started or the engine working conditions are retained.

In step S11, whether or not the negative pressure BRKNP exceeds the IS negative pressure threshold THNPIS is decided. When the negative pressure BRKNP exceeds the IS negative pressure threshold THNPIS, the step moves on to step S12 and the engine 1 is stopped, and, otherwise, the step moves on to step S13, and the engine is started or the engine working conditions are retained.

In step S14, whether or not the conditions to allow idling stop control are met—to be more specific, whether or not the brake pedal 6 is operated, whether or not the temperature of the engine 1 is equal to or greater than a predetermined value, whether or not the oil temperature is equal to or greater than a predetermined value, and so on—is decided. When the conditions to allow idling stop control are met, the step moves on to step S15, and, otherwise, the step moves on to step S20, and the engine working conditions are retained.

In step S15, whether or not the amount of brake pedal operation BRKQ exceeds the IS operation amount threshold THQIS is decided. When the amount of brake pedal operation BRKQ exceeds the IS operation amount threshold THQIS, the step moves on to step S16, and, otherwise, the step moves on to step S18, and the engine is started or the engine working conditions are retained.

In step S16, whether or not the negative pressure BRKNP exceeds the IS negative pressure threshold THNPIS is decided. When the negative pressure BRKNP exceeds the IS negative pressure threshold THNPIS, the step moves on to step S17 and the engine 1 is stopped, and, otherwise, the step moves on to step S18, and the engine is started or the engine working conditions are retained.

[Operation]

Next, the operation based on the above control process will be described using comparative examples.

When a Negative Pressure Threshold is Provided During Coast Stop: Embodiment 1

Figure 3:
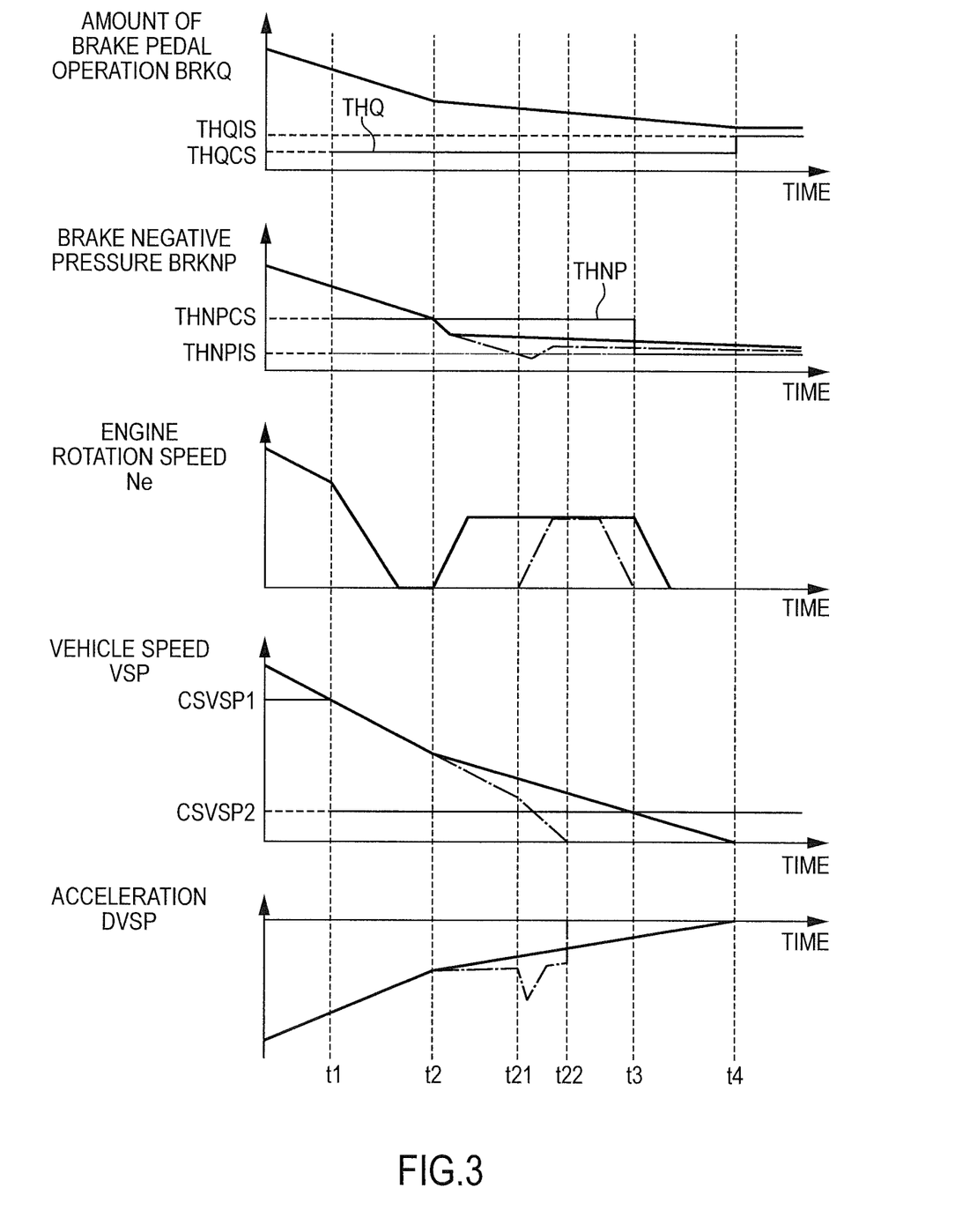
FIG. 3 provides time charts showing an operation of a process of setting coast stop allowing thresholds upon coast drive, according to embodiment 1.

FIG. 3 provides time charts showing the operation of the process of setting the negative pressure threshold THNP upon coast drive, according to embodiment 1. In FIG. 3, the changes of the amount of brake pedal operation BRKQ, the negative pressure BRKNP, the engine rotation speed Ne, the vehicle speed VSP, and the acceleration DVSP are shown in order from the top. The driving conditions at the first time in this time chart (presumed conditions) assume the coast driving state, in which the driver's foot is released from the accelerator pedal while driving.

At and before time t1, the vehicle speed VSP is equal to or greater than the predetermined vehicle speed CSVSP1. Consequently, the control process of FIG. 2 follows the flow of steps S1→S2→S3→S4→S20, and the working conditions of the engine 1 are retained. Also, the amount of brake pedal operation BRKQ by the driver decreases gradually.

At time t1, the vehicle speed VSP becomes lower than the predetermined vehicle speed CSVSP1, the amount of brake pedal operation BRKQ exceeds the CS operation amount threshold THQCS, and the negative pressure BRKNP exceeds the CS negative pressure threshold THNPCS. Consequently, the control process of FIG. 2 follows the flow of steps S1→S2→S3→S4→S5→S6→S7→S8, and the engine 1 is stopped. After time t1 to start stopping the engine, the engine rotation speed decreases rapidly toward zero.

At time t2, the negative pressure BRKNP becomes equal to or lower than the CS negative pressure threshold THNPCS. Consequently, the control process of FIG. 2 follows the flow of steps S1→S2→S3→S4→S5→S6→S7→S9, and the engine 1 is re-started. At and before time t2, the negative pressure BRKNP is secured, so that the force with which the brake is operated is multiplied sufficiently. Consequently, even if the engine 1 is re-started, the force with which the brake is operated does not increase significantly and there is no sudden increase of deceleration.

At time t3, the vehicle speed VSP becomes lower than the predetermined vehicle speed CSVSP2, and the negative pressure threshold THNP switches from the CS negative pressure threshold THNPCS to the IS negative pressure threshold THNPIS. At this time, the negative pressure BRKNP exceeds the IS negative pressure threshold THNPIS. Consequently, the control process of FIG. 2 follows the flow of steps S→S2→S3→S4→S5→S10→S11→S12, and the engine 1 is stopped. At and after time t3 to start stopping the engine, the engine rotation speed decreases rapidly toward zero.

At time t4, the vehicle speed VSP becomes zero, and the operation amount threshold THQ switches from the CS operation amount threshold THQCS to the IS operation amount threshold THQIS. At this time, the amount of brake pedal operation BRKQ exceeds the IS operation amount threshold THQIS, and the negative pressure BRKNP exceeds the IS negative pressure threshold THNPIS. Consequently, the control process of FIG. 2 follows the flow of steps S1→S2→S14→S15→S16→S17, and the engine is kept stopped.

When a Negative Pressure Threshold is not Provided During Coast Stop: Comparative Example Next, the operation of a comparative example, in which control is executed using the IS negative pressure threshold THNPIS, without providing the CS negative pressure threshold THNPCS during coast stop, will be described. The time charts of the comparative example are shown with one-dot chain lines in FIG. 3.

In the comparative example, again, the operation up to time t2 is the same as in embodiment 1.

At time t2, the negative pressure BRKNP exceeds the IS negative pressure threshold THNPIS. Consequently, the engine is kept stopped.

At time t21, the negative pressure BRKNP becomes equal to or lower than the IS negative pressure threshold THNPIS, and the engine 1 is re-started. At time t21, the negative pressure BRKNP is low, and therefore the force with which the brake is operated is not multiplied sufficiently. Consequently, as the engine 1 is re-started, negative pressure is produced in the masterback 5 and the force with which the brake is operated increases significantly, so that a sudden increase of deceleration occurs, and this gives a shock.

At time t22, although the vehicle speed VSP becomes zero, since sufficient negative pressure is not secured, the conditions of idling stop control are not met, and the engine 1 is kept working until negative pressure is secured.

By contrast with this, with embodiment 1, the CS negative pressure threshold THNPCS is set greater than the IS negative pressure threshold THNPIS, as described above. Consequently, it is possible to start the engine 1 in a state where there is sufficient negative pressure BRKNP, so that, even if the engine 1 is re-started, the force with which the brake is operated does not increase significantly, and it is possible to prevent a sudden increase of deceleration.

Also, it is possible to secure sufficient negative pressure during coast drive, so that, it is possible to stop the engine 1 shortly after the vehicle stops and start idling stop.

[Advantages]

As described above, with embodiment 1, the following advantages can be achieved.

(1) A master cylinder pressure sensor 13 (brake pedal operation amount detecting means), which detects the amount of brake pedal operation BRKQ by the driver, a masterback 5 (negative pressure-based force multiplying means), which multiplies the force with which the brake is operated, by using the intake negative pressure of the engine 1, a negative pressure sensor 15 (negative pressure detecting means), which detects the negative pressure BRKNP of the masterback 5, and an engine control unit 10 (coast stop control means), which, during coast drive, stops the engine 1 when the amount of brake pedal operation BRKQ that is detected is equal to or greater than the CS operation amount threshold THQCS (the first operation amount threshold), and, after the engine stops, re-starts the engine 1 when the negative pressure BRKNP that is detected falls below the CS negative pressure threshold THNPCS (the first negative pressure threshold), are provided. Consequently, it is possible to start the engine 1 before there is no more negative pressure BRKNP, and, even if the engine 1 is re-started, the force with which the brake is operated does not increase significantly, so that it is possible to prevent a sudden increase of deceleration.

(2) While the vehicle is stopped, the engine control unit 10 (idling stop control means and negative pressure threshold setting means) stops the engine 1 when the amount of brake pedal operation BRKQ that is detected is equal to or greater than the IS operation amount threshold THQIS (second operation amount threshold), and, after the engine stops, re-starts the engine when the negative pressure BRKNP that is detected falls below the IS negative pressure threshold THNPIS (the second negative pressure threshold), and sets the CS operation amount threshold THQCS to a higher value than the IS negative pressure threshold THNPIS. By this means, it is possible to start the engine 1 in a state where there is sufficient negative pressure BRKNP, so that, even if the engine 1 is re-started, the force with which the brake is operated does not increase significantly, and therefore it is possible to prevent a sudden increase of deceleration.

(3) While the vehicle speed VSP is equal to or lower than the predetermined vehicle speed CSVSP, the engine control unit 10 re-starts the engine when the negative pressure BRKNP that is detected after the engine stops during coast drive falls below the IS negative pressure threshold THNPIS. By this means, it is possible to secure sufficient negative pressure during coast drive, so that it is possible to stop the engine 1 shortly after the vehicle stops and start idling stop.

OTHER EMBODIMENTS

Although the present invention has been described above based on embodiment 1, the above embodiment is by no means limiting, and other configurations may be covered by the present invention as well. For example, although an example to employ a belt-type continuously-variable transmission has been illustrated with embodiment 1, configurations to have other automatic stepwise variable transmissions, manual variable transmissions and so on may be used as well. Also, although examples to have a torque converter have been illustrated, vehicles without a torque converter are also applicable. In these cases, as parameters of the conditions to allow coast stop control (engine automatic stop), other parameters (the combination of the vehicle speed and the transmission ratio, the engine rotation speed, and so on) to indicate whether or not it is possible to maintain the self-sustaining rotation of the engine may be used, instead of the predetermined vehicle speed CSVSP1.

This application claims priority based on Japanese Patent Application No. 2011-266602, filed with the Japan Patent Office, on Dec. 6, 2011, the entire contents of which are expressly incorporated herein by reference.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

The invention claimed is:
1. A vehicle engine automatic control device, comprising:
a brake pedal operation amount detector that detects an amount of brake pedal operation by a driver;
a negative pressure-based force multiplying unit that multiplies a force, with which a brake is operated, using an intake negative pressure of an engine;
a negative pressure detector that detects a negative pressure of the negative pressure-based force multiplying unit;
a vehicle speed detector that detects a vehicle speed; and
a controller programmed to:
stop the engine when the amount of brake pedal operation that is detected is equal to or greater than a first operation amount threshold and the amount of the negative pressure that is detected is equal to or greater than a first negative pressure threshold while the vehicle is running and the vehicle speed that is detected is higher than zero and lower than a predetermined vehicle speed;
re-start the engine when the negative pressure that is detected falls below the first negative pressure threshold after the engine stops;
stop the engine when the amount of brake pedal operation that is detected is equal to or greater than a second operation amount threshold and the amount of the negative pressure is equal to or greater than a second negative pressure threshold while the vehicle speed that is detected is zero and the vehicle is stopped; and
re-start the engine when the negative pressure that is detected falls below the second negative pressure threshold after the engine stops; and
wherein the second operation amount threshold is higher than the first operation amount threshold, and
wherein the first negative pressure threshold is higher than the second negative pressure threshold.

2. A vehicle engine automatic control method, comprising:
detecting an amount of brake pedal operation by a driver and a vehicle speed;
multiplying a force, with which a brake is operated, using an intake negative pressure of an engine by a negative pressure-based force multiplying unit;
detecting a negative pressure of the negative pressure-based force multiplying unit;
stopping the engine under a coast stop control when the amount of brake pedal operation that is detected is equal to or greater than a first operation amount threshold and the amount of the negative pressure that is detected is equal to or greater than a first negative pressure threshold while the vehicle is running and the vehicle speed that is detected is higher than zero and lower than a predetermined vehicle speed;
re-starting the engine when the negative pressure that is detected falls below the first negative pressure threshold after the engine stops;
stopping the engine under an idling stop control when the amount of brake pedal operation that is detected is equal to or greater than a second operation amount threshold and the amount of the negative pressure is equal to or greater than a second negative pressure threshold while the vehicle speed that is detected is zero and the vehicle is stopped; and
re-starting the engine when the negative pressure that is detected falls below the second negative pressure threshold after the engine stops; and
wherein the second operation amount threshold is higher than the first operation amount threshold, and
wherein the first negative pressure threshold is higher than the second negative pressure threshold.

3. The vehicle engine automatic control device according to claim 1, wherein the controller determines whether to re-start the engine after switching the negative pressure threshold.

4. The vehicle engine automatic control method according to claim 2, further comprising determining whether to re-start the engine after switching the negative pressure threshold.

\* \* \* \* \*